United States Patent Office 3,644,462
Patented Feb. 22, 1972

3,644,462
PREPARATION OF AROMATIC ISOCYANATES BY CATALYTIC CARBONYLATION OF NITRO COMPOUNDS
Eric Smith, Madison, and Ehrenfried H. Kober, Hamden, Conn., assignors to Olin Mathieson Chemical Corporation
No Drawing. Filed Mar. 12, 1969, Ser. No. 806,727
Int. Cl. C07c 119/04; C07f 15/00
U.S. Cl. 260—453 P     27 Claims

ABSTRACT OF THE DISCLOSURE

The process for preparing an organic isocyanate by reacting an organic nitro compound with carbon monoxide in the presence of a catalyst system comprising a halide of a noble metal and an amine composition. Useful amine compositions include compounds of the formula:

RR'R''N wherein R, R', and R'' are each selected from the group consisting of hydrogen, alkyl, cycloalkyl, aralkyl, and

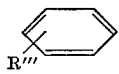

and wherein not more than two of the R, R' and R'' substituents are hydrogen. Preferred amines include tri-n-butyl amine, aniline, aniline-2-sulfonic acid, o-phenylene diamine, anthranilic acid, N-phenyl anthranilic acid, anthranilamide, o-aminophenol, o-aminobenzene thiol, benzyl amine, diphenyl amine, and triphenyl amine. The noble metal halide is preferably a halide of palladium, rhodium, iridium, rhenium, platinum, and mixtures thereof. The catalyst system may also include molybdenum trioxide or another metal oxide.

This invention relates to an improved process for a preparation of organic isocyanates from organic nitro compounds in which a catalyst system comprising a halide of a noble metal and an amine composition is employed.

Organic isocyanates are used extensively in the preparation of urethane foams, coatings, fibers as well as in the preparation of insecticides, pesticides and the like. Commercial processes for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride, and the like.

Other proposed simplified techniques utilize other catalyst systems. For example, Belgian Pat. No. 672,405 entitled "Process for the Preparation of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocynates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and an elevated temperature in the presence of:

(I) a catalyst system comprised of:
(A) at least one amine composition having the formula:

RR'R''N wherein R, R' and R'' are each selected from the group consisting of:

(a) hydrogen,
(b) alkyl,
(c) cycloalkyl,
(d) aralkyl,

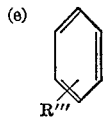

wherein R''' is selected from the group consisting of:

(f) hydrogen,
(g) alkyl,
(h) COOH,
(i) $SO_3H$,
(j) $CONH_2$,
(k) $NH_2$,
(l) OH, and
(m) SH, wherein not more than two of the R, R', and R'' substituents are hydrogen, and (B) at least one halide of a noble metal, or
(II) a catalyst system comprised of a complex of a compound of I-A and a halide of I-B.

In R, R', R'' and R''' above, the alkyl group contains between 1 and 8 carbon atoms, including methyl, ethyl, isopropyl, n-butyl, isoamyl, n-hexyl, isohexyl, n-octyl, etc. The cycloalkyl group contains from 3 to 12 carbon atoms and includes cyclopropyl, cycloamyl, cyclohexyl, cyclooctyl, etc., while the aralkyl group contains 7 to 12 carbon atoms and includes phenylmethyl, phenylethyl, phenylisobutyl, tolylethyl, tolyl-n-hexyl, xylylisopropyl, etc.

Any organic nitro compounds capable of being converted to an organic isocyanate may be employed as a reactant. Generally, aromatic, cycloaliphatic, and aliphatic mono- or polynitro compound, which may be substituted, if desired, can be reacted to form the corresponding mono- or poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) Aromatic nitro compounds (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines (II) Nitrocycloalkanes (a) Nitrocyclobutane
(b) Nitrocyclopentane
(c) Nitrocyclohexane
(d) Dinitrocyclohexanes
(e) Bis(nitrocyclohexyl)methanes (III) Nitroalkanes (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted organic nitro compounds which can be used are as follows:

(1) o-Nitrotoluene
(2) m-Nitrotoluene
(3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α-Dinitro-p-xylene
(22) 2,4,6-trinitrotoluene
(23) 1,3,5-trinitrobenzene
(24) 1-chloro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrotoluene
(41) α,α-dibromo-p-nitrotoluene
(42) α-bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers. Generally, the organic nitro compounds and substituted organic nitro compounds contain between 1 and about 20 carbon atoms, and preferably between about 6 and about 14 carbon atoms.

The catalyst system of this invention is comprised of at least one amine composition and at least one noble metal halide. The amine compositions useful in this invention have the formula:

wherein R, R' and R" are each selected from the group consisting of:

(a) hydrogen,
(b) alkyl,
(c) cycloalkyl,
(d) aralkyl,

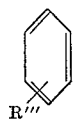

wherein R''' is selected from the group consisting of:

(f) hydrogen,
(g) alkyl,
(h) COOH,
(i) $SO_3H$,
(j) $CONH_2$,
(k) $NH_2$,
(l) OH, and
(m) SH;

and wherein not more than two of the R, R', and R" substituents are hydrogen.

In the process of this invention certain amine compositions have been found to be especially efficacious when used with the noble metal halides. The diaryl and triaryl amine, such as diphenyl amine and triphenyl amine, form a particularly useful class of amine compositions in this invention.

Another group of amine compositions which are especially useful in the process of this invention include:

(a) aniline
(b) aniline-2-sulfonic acid
(c) o-phenylene diamine
(d) anthranilic acid
(e) N-phenyl anthranilic acid
(f) anthranilamide
(g) o-aminophenol
(h) o-aminobenzene thiol
(i) benzyl amine
(j) dibenzyl amine
(k) tri-n-butyl amine Examples of other amine compositions useful in the catalyst system of this invention include:

(1) N-methyl aniline
(2) N,N-dimethyl aniline
(3) N-ethyl aniline
(4) N-isopropyl aniline
(5) N-isoamyl aniline
(6) N-hexyl aniline
(7) N-isooctyl aniline
(8) N,N-diisopropyl aniline
(9) N-amyl-N-heptyl aniline
(10) N-isoamyl-N-hexyl aniline
(11) 3-methyl aniline
(12) 4-isoamyl aniline
(13) 2-n-heptyl aniline
(14) N,N-di-n-hexyl aniline
(15) N,N-diisooctyl aniline
(16) 3-phenylethyl aniline
(17) aniline-3-sulfonic acid
(18) N,N-di-n-hexyl aniline-3-sulfonic acid
(19) N-isoamyl-2-sulfonic acid
(20) aniline-2-sulfonic acid
(21) aniline-4-sulfonic acid
(22) N-isobutylaniline-4-sulfonic acid
(23) 1-(N,N-dimethylamino)-3-propyl benzene
(24) N-ethyl-N-isobutylamino
(25) methylamino benzene
(26) 1-isobutylamino-4-isoheptyl benzene
(27) 1-(N-isohexyl-N-octylamino)-3-ethyl benzene
(28) 1heptylamino-4-n-octyl benzene
(29) 1-(N,N-diethylamino)-3-n-hexyl benzene
(30) methylpropylamino benzene
(31) 1-(N,N-diisoamylamino)-4-methyl benzene
(32) 1-(N-isopropyl-N-amylamino)-3-n-heptyl benzene
(33) o-phenylene diamine
(34) m-phenylene diamine
(35) p-phenylene diamine
(36) 1-methylamino-2-carboxy benzene
(37) 1-(N,N-diethylamino)-2-carboxy benzene
(38) 1-n-butylamino-2-carboxy benzene
(39) 1-(N,N-dimethylamino)-4-carboxy benzene
(40) 1-isoheptylamino-2-carboxy benzene
(41) 1-methylamino-4-carboxy benzene
(42) 1-phenylamino-2-carboxy benzene
(43) 1-phenylethylamino-3-carboxy benzene
(44) 1-tolylpropylamino-2-carboxy benzene
(45) 1-(N-xylyl-N-amylamino)-4-carboxy benzene
(46) 2-(N,N-dixylylamino)-3-carboxy benzene
(47) 1-naphthylmethylamino-2-carboxy benzene
(48) 1-methylamino-2-hydroxy benzene
(49) 1-diethylamino-2-hydroxy benzene
(50) 1-hexylamino-2-hydroxy benzene
(51) 1-amino-2-hydroxy-3-methyl benzene
(52) 1-amino-2-hydroxy-4-butyl benzene
(53) 1-amino-2-hydroxy-3-n-amyl benzene
(54) 1-hydroxy-2-amino-3-methyl benzene
(55) 1-hydroxy-2-phenylethylamino benzene
(56) 1-isoamylamino-2-hydroxy benzene
(57) 1-phenylisoheptylamino-2-hydroxy benzene
(58) 1-tolyl-n-propylamino-2-hydroxy benzene
(59) 1-naphthylamino-2-hydroxy benzene
(60) 1-di(phenylisopropyl)amino-2-hydroxy benzene
(61) 1-tolylethylamino-4-hydroxy benzene
(62) 1-phenylisoheptylamino-4-hydroxy benzene
(63) 1-amino-3-mercapto benzene
(64) 1-methylamino-2-mercapto benzene
(65) 1-di(isopropyl)amino-3-mercapto benzene
(66) 1-hexylamino-3-mercapto benzene
(67) 1-di(phenylisobutyl)amino-2-mercapto benzene
(68) cyclopropylamino-2-mercapto benzene
(69) cyclohexylamino-2-mercapto benzene
(70) phenylbutylamino-2-mercapto benzene
(71) di(phenylmethyl)amino benzene(dibenzylamine)
(72) phenylmethylamino benzene
(73) 1-phenyl-n-propylamino-3-ethyl benzene
(74) 1-tolylisopropylamino benzene
(75) 1-di(tolylisoamyl)amino benzene
(76) triethyl amine
(77) ethyldiamyl amine
(78) triisopropyl amine
(79) tri-n-propyl amine
(80) triisohexyl amine
(81) triisooctyl amine
(82) dimethyl isobutyl amine
(83) phenylethyl diisopropyl amine
(84) methyl naphthylisobutyl amine
(85) ethyl ditolyl amine
(86) isohexyl phenyl tolyl amine
(87) methyl diphenyl amine
(88) n-hexyl phenyl tolyl amine
(89) isohexyl phenyl naphthyl amine
(90) ethyl phenyl tolyl amine The second component of the catalyst system is at least one halide of a noble metal. Noble metals include ruthenium, rhenium, rhodium, palladium, osmium, iridium, platinum, silver and gold. The halides of palladium, rhodium, platinum, iridium, rhenium, and mixtures thereof are particularly preferred noble metal halides. Typical examples of suitable halides include palladous bromide, palladous chloride, palladous fluoride, palladous iodide, rhodium tribromide, rhodium trichloride, rhodium trifluoride, rhodium triiodide; ruthenium dichloride, ruthenium trichloride, ruthenium tetrachloride; osmium dichloride, osmium trichloride, osmium tetrachloride; platinic bromide, platinous bromide, platinic chloride, platinous chloride, platinic fluoride, platinous iodide, platinic iodide, rhenium trichloride, rhenium, tetrachloride, iridium tribromide, rhenium hexafluoride, rhenium tribromide, iridium tribromide, iridium tetrabromide, iridium triiodide, iridium tetraiodide and mixtures thereof. An especially useful group of noble metal halides includes palladous chloride, rhodium trichloride, iridium trichloride, platinic chloride, and mixtures thereof. Oxides of the noble metals may also be employed and the term "halide of a noble metal" is used throughout the description and claims is intended to include the above-mentioned metal halides as well as the corresponding oxides, such as palladium oxide, rhodium oxide, platinum oxide, etc., and the like.

The use of the amine composition in catalytic combination with the noble metal halide is generally accomplished by adding the amine compositions and the noble metal halide separately to the reaction system or, if desired, they may be premixed prior to adding the organic nitro compound. However, it has also been determined that complexes which can be formed by reacting the noble metal halide and the amine composition also can be utilized very effectively as the catalyst system in the conversion of the nitro compounds to isocyanates with carbon monoxide. These complexes are conveniently prepared by the reaction of the nitrogen-containing aromatic compound with the previously recited noble metal halides. For example, to an aqueous solution of $K_2PdCl_4$ there is added slowly, with agitation, at room temperature an equivalent amount of dibenzylamine (i.e., 2 moles of dibenzylamine per mole of $K_2PdCl_4$). The resulting mixture is stirred for several hours and the formed precipitate of the complex is isolated by filtration, washed with water and with cold ethanol, recrystallized from ethanol and dried in vacuo at 50° C. to yield the complex $$Pd[(C_6H_5CH_2)_2NH]_2Cl_2$$

Thus, it is to be understood that in the practice of this invention the use of the amine composition in combination with the use of the noble metal halide may involve either the separate addition of each to the reaction system or, if desired, the prior formation of a complex of the two materials and subsequent use thereof in the reaction.

When complexes are formed with the amine compositions of this invention which have the general formula:

$$RR'R''N$$

wherein R, R' and R'' have the same meaning as previously described, and palladous chloride ($PdCl_2$), for example, the resulting complexes may be represented by the general formula:

$$Pd(RR'R''N)_2Cl_2$$

In a like manner complexes prepared with rhodium trichloride and the amine compositions of this invention may be represented by the general formula:

$$Rh(RR'R''N)_3Cl_3$$

Typical complexes useful in the process of this invention include:

$Pd[(C_6H_5)_3N]_2Cl_2$
$Pol[(C_4H_7)_3N]_2Cl_2$
$Rd[(C_4H_7)_3N]_3Cl_3$
$Pol(C_6H_5NH_2)_2Cl_2$
$Pd(C_6H_5NH_2)_2F_2$
$Rh(C_6H_5NH_2)_3I_3$
$Pd(C_6H_5NH_2)_2Br$
$Rh(o\text{-phenylene diamine})_3Cl_3$
$Pd(o\text{-aminobenzene thiol})_2Br_2$
$Pd(N\text{-phenyl anthranilic acid})_2I_2$
$Rh(anthranilamide)_3Cl_3$
$Rh(aniline\text{-}2\text{-sulfonic acid})_3Cl_3$
$Ir(C_6H_5NH_2)_3Cl_3$
$Ir(benzyl amine)_3Cl_3$
$Re(o\text{-aminobenzene diamine})_3Cl_3$
$Re(N\text{-phenyl anthranilic acid})_2Br_2$
$Pd(C_6H_5CH_2NH_2)_2Cl_2$
$Pd[(C_6H_5CH_2)_2NH]_2Cl_2$
$Pt(C_6H_5NH_2)_2Cl_2$
$Os(dibenzylamine)_4Cl_4$
$Os(C_6H_5NH_2)_4Cl_4$
$Ru(o\text{-aminobenzene thiol})_3F_3$
$Ru[(C_4H_7)_3N]_3Br_3$
$Ru(C_6H_5NH_2)_5Cl_5$ Any of the useful amine compositions can be reacted in the manner described above with a noble metal halide to form the corresponding organic metal halide complex for use as the catalyst in this invention. Other suitable complexes and techniques for preparing the complexes of the amine compositions and halides of a noble metal are found in the following papers.

(1) "Synthesis and Infrared Study of Some Rhodium Coordination Compounds," by James P. Collman and Henry F. Holtzclaw, Jr., Journal of American Chemical Society, vol. 80, May 5, 1958, pp. 2054–2056.

(2) "Catalytic Approaches to Complex Compounds of Rhodium (III)," by R. D. Gillard, J. A. Osborn, and G. Wilkinson, Journal Chemical Society, pp. 1951–1965, 1965.

The catalyst system can be self-supported or deposited on a support or carrier for dispersing the catalyst system to increase its effective surface. Alumina, silica, carbon, barium sulfate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of the amine composition to the noble metal halide is generally between about 0.1 and about 10 and preferably between about 0.5 and about 4 but greater or lesser ratios may be employed if desired.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic or aromatic solvents, such as n-heptane, cyclohexane, benzene, toluene, and xylene, and halogenated aliphatic and aromatic hydrocarbon such as dichloromethane, tetrachloroethane, trichlorotrifluoro ethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent, is in the range between about 5.0 and about 75 percent, but greater or lesser proportions may be employed if desired.

The order of mixing the reactants is not critical and may be varied within the limitations of the equivalent employed. In one embodiment, the organic nitro compound, catalyst system, and if desired, solvent, is charged to a suitable pressure vessel such as an autoclave which is preferably provided with agitation means such as a stirrer or an external rocking mechanism. At start-up after purging the system with nitrogen gas, carbon monoxide is fed into the autoclave until a pressure is attained, at ambient temperature, which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressure may be employed if desired.

Generally, the quantity of carbon monoxide in the free space of the reactor is sufficient to maintain the desired pressure as well as provide reactant for the process, as the reaction progresses. The reaction is believed to progress in accordance with the following equation:

(I) $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide-containing gas streams greatly reduces the overall consumption of carbon monoxide.

The reaction temperature is generally maintained above about 25° C. and preferably between about 100° C. and about 250° C. Interior and/or exterior heating and cooling means may be employed to maintain the temperature of the reactor within the desired range.

The reaction time is dependent upon the organic nitro compound being reacted, temperature, pressure and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much lower, i.e., substantially instantaneous and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains an amine composition and a noble metal halide but also contains a third component comprised of certain metal oxides. Oxides suitable as a third component of the catalyst system include at least one oxide of an element selected from the group consisting of vanadium, molybdenum, tungsten, niobium, chromium, tantalum, and iron, as described in copending application Ser. No. 619,158, filed Feb. 28, 1967, for Process, by Schnabel et al. and Ser. No. 757,105, filed Sept. 3, 1968, for Noble Metal Catalyst System Containing Oxide of Iron by Rao et al. These elements, with the exception of iron, are found in Groups V$a$ and VI$a$ of the Periodic Table shown on page 122 of Inorganic Chemistry by Moeller, John Wiley and Sons, Inc. 1952. Suitable oxides of this type include chromic oxide ($Cr_2O_3$), chromium dioxide ($CrO_2$), chromous oxide (CrO); molybdenum dioxide ($MoO_2$), molybdenum trioxide ($MoO_3$) and molybdenum sesquioxide ($Mo_2O_3$); niobium monoxide (NbO), niobium oxide ($NbO_2$), and niobium pentoxide ($Nb_2O_5$); tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), ferrous oxide (FeO) and ferric oxide ($Fe_2O_3$). Mixtures of two or more of these oxides may be employed as one component of the catalyst mixture. The proportion of the third component of the catalyst system, when one is employed, is generally equivalent to a weight ratio of the noble metal halide to the metal oxide in the catalyst system generally in the range between about 0.001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLE I

In this example, 2,4-dinitrotoluene (5.0 g.), rhodium trichloride ($RhCl_3$) (0.4 g., $2.26 \times 10^{-3}$ moles) and aniline ($2.26 \times 10^{-3}$ moles) were charged to a clean, 100 ml. stainless steel autoclave (316 grade) together with orthodichlorobenzene solvent (5 ml.).

The autoclave was sealed after being so charged, then pressured with nitrogen and tested for leaks. Nitrogen was released and the autoclave was pressured with carbon monoxide to about 2500 p.s.i.g. During the reaction the autoclave was rocked in a rocker (36 cycles per minute), and heated during one hour to 190° C., when the internal pressure rose to about 3800 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solution was subjected to a determination of its infrared spectrum to test for the presence of isocyanates (which possess a characteristic infrared light absorption at about 4.5 microns). The weight percentages of 2,4-dinitrotoluene, 2,4-toluene diisocyanate, 2-isocyanato-4-nitrotoluene and 4-isocyanato-2-nitrotoluene in the filtrated were determined by vapor phase chromatography. The conversion of 2,4-dinitrotoluene was calculated to be 100 percent. The yield of 2,4-toluene diisocyanate and the combined yield of mononitrotolyl isocyanates were calculated and corrected for the amount of converted 2,4-dinitrotoluene. The yield of toluene diisocyanate was 12 percent and the total yield of isocyanate products was 36 percent.

For purposes of comparison additional experiments were carried out employing a procedure similar to that of Example I except that the catalyst was solely $PdCl_2$ or solely $RhCl_3$. Not more than a trace of isocyanate was detected in these experiments.

EXAMPLES II–XXIV

The procedure of Example I was repeated except that the catalyst system employed was varied as shown in Table 1. Other pertinent details are also given in Table 1 which follows:

total isocyanate product including monoisocyanato mononitro toluenes was 51 percent, the yield of 2,4-toluene di-

TABLE 1

| Example | Catalyst Noble metal halide | Percent by weight[1] | Amine composition | Moles of amine composition/ mole noble metal halide | Percent conversion | Percent yield TDI[2] | Total product[3] |
|---|---|---|---|---|---|---|---|
| II | RhCl₃ | 8 | Aniline | 1:1 | 68 | 6 | 37 |
| III | RhCl₃ | 8 | ...do... | 2:1 | 99 | 5 | 13 |
| IV | RhCl₃ | 8 | ...do... | 2:1 | 95 | 4 | 20 |
| V | RhCl₃ | 8 | o-Phenylene diamine | 1:1 | 88 | 7 | 30 |
| VI | RhCl₃ | 8 | ...do... | 1:1 | 81 | 4 | 28 |
| VII | PdCl₂ | 8 | ...do... | 1:1 | 67 | 9 | 14 |
| VIII | PdCl₂ | 8 | ...do... | 1:1 | 85 | 1 | 10 |
| IX | PdCl₂ | 8 | Anthranilic acid | 1:1 | 66 | 0 | 8 |
| X | PdCl₂ | 8 | ...do... | 1:1 | 39 | 0 | 9 |
| XI | PdCl₂ | 8 | o-Aminophenol | 1:1 | 85 | 2 | 19 |
| XII | PdCl₂ | 8 | ...do... | 1:1 | 75 | 1 | 17 |
| XIII | RhCl₃ | 8 | ...do... | 1:1 | 61 | 0 | 11 |
| XIV | RhCl₃ | 8 | o-Aminobenzene thiol | 1:1 | 56 | 0 | 16 |
| XV | RhCl₃ | 8 | Anthranilamide | 1:1 | 58 | 0 | 16 |
| XVI | PdCl₂ | 8 | ...do... | 1:1 | 34 | 0 | 10 |
| XVII | RhCl₃ | 8 | Aniline-2-sulfonic acid | 1:1 | 4 | 1 | 20 |
| XVIII | PdCl₂ | 8 | ...do... | 1:1 | 59 | 0 | 5 |
| XIX | RhCl₃ | 8 | N-phenyl anthranilic acid | 1:1 | 52 | 0 | 13 |
| XX | PdCl₂ | 8 | ...do... | 1:1 | 60 | 3 | 22 |
| XXI | RhCl₃ | 8 | Triphenyl amine | 3:1 | 65 | 4 | 45 |
| XXII | RhCl₃ | 8 | ...do... | 1:1 | 85 | 17 | 61 |
| XXIII | RhCl₃ | 8 | Benzyl amine | 1:1 | 78 | 10 | 43 |
| XXIV | PdCl₂ | 8 | Diphenyl amine | 2:1 | 63 | 1 | 22 |

[1] Based on weight of 2,4-dinitrotoluene employed which was 5 grams in all examples.
[2] 2,4-toluene diisocyanate.
[3] Total isocyanate product, including monoisocyanato-mononitro compounds.

EXAMPLE XXV

In this example, a complex of palladous chloride and aniline was prepared and utilized as the catalyst in the preparation of isocyanates.

Preparation of catalyst complex

To an aqueous solution of $K_2PdCl_4$ there was added slowly with agitation and at room temperature an equivalent amount of aniline dissolved in ethanol. In this instance two moles of aniline were added for each mole of $K_2PdCl_4$ present in the aqueous solution. After the thus prepared mixture had been stirred for several hours, a precipitate formed which was isolated by filtration, washed first with water, then with cold ethanol, recrystallized from ethanol and finally dried in vacuo at 50° C. to yield the complex of $Pd(C_6H_5NH_2)_2Cl_2$.

Preparation of isocyanates

A total of 3.0 g. of 2,4-dinitrotoluene and 0.36 g. of the complex $Pd(C_6H_5NH_2)_2Cl_2$ and 0.09 g. of $MoO_3$ were charged to a clean 103 ml. stainless steel autoclave (316 grade) together with orthodichlorobenzene solvent (15 ml.).

The autoclave was sealed after being so charged, then pressured with nitrogen and tested for leaks. The nitrogen was released and the autoclave was pressured with carbon monoxide to about 2500 p.s.i.g. The reaction mixture was heated to 190° C. and then maintained at that temperature for 1.5 hours during which time a maximum pressure of about 4000 p.s.i.g. was attained. During the heating period, the autoclave was rocked in a rocker (36 cycles per minute). After cooling to room temperature, the autoclave was vented and the resulting reaction mixture was filtered. On subjecting the filtrate to vapor phase chromatographic analysis it was found that the yield of isocyanate was 16 percent and the conversion of 2,4-dinitrotoluene was 70 percent.

EXAMPLES XXVI-XXVII

The general procedure of Example XXV was repeated with respect to the preparation of the catalyst complex and with respect to the reaction of 2,4-dinitrotoluene with carbon monoxide in the presence of the catalyst system. Details are set forth in Table 2 which follows:

TABLE 2

| Example | Catalyst complex | Weight (g.) | Metal oxide | Weight (g.) | Percent conversion | Percent yield TDI[1] | Total product[2] |
|---|---|---|---|---|---|---|---|
| XXV | Pd[(C₆H₅CH₂)₂NH]₂Cl₂ | 0.58 | MoO₃ | 0.9 | 67 | 13 | 43 |
| XXVII | Pd[(C₄H₉)₃N]₂Cl₂ | 0.59 | MoO₃ | 0.9 | 72 | 16 | 57 |

[1] 2,4-toluene diisocyanate.
[2] Total isocyanate product, including monoisocyanato-mononitro compounds. The weight of 2,4-dinitrotoluene employed was 3 grams in these examples.

What is claimed is:

1. In the process for preparing an aromatic isocyanate by reacting an aromatic nitro compound containing up to about 20 carbon atoms with carbon monoxide at an elevated temperature and an elevated pressure in the presence of a catalyst, the improvement which comprises employing as said catalyst, a catalyst system comprised of
   (I) a mixture of
       (A) an amine composition of the formula

RR'R''N wherein R, R' and R'' are each selected from the group consisting of
       (1) hydrogen,
       (2) alkyl containing 1 to 8 carbon atoms,
       (3) cycloalkyl containing 3 to 12 carbon atoms,
       (4) aralkyl containing 7 to 12 carbon atoms, and (5) 

wherein R''' is selected from the group consisting of
(a) hydrogen,
(b) alkyl containing 1 to 8 carbon atoms,
(c) COOH,
(d) SO₃H,
(e) CONH₂,
(f) NH₂,
(g) OH, and
(h) SH,
(6) wherein not more than 2 of the R, R' and R'' substituents are hydrogen, and
(B) a noble metal compound selected from the group consisting of noble metal halides and noble metal oxides, or
(II) a complex of a compound of I–A and a noble metal compound of I–B,
(III) wherein the molar ratio of said amine composition to the anion of said noble metal compound in said catalyst system is in the range between about 0.1:1 and about 10:1, and
(IV) wherein the noble metal of said noble metal compound is selected from the group consisting of palladium, rhodium, iridium, platinum, rhenium, ruthenium and mixtures thereof.

2. The process of claim 1 wherein the molar ratio of said amine composition to the anion of said noble metal compound is in the range between about 0.5 and about 4:1.

3. The process of claim 1 wherein the proportion of said catalyst system is between about 0.001 and about 500 weight percent of said aromatic nitro compound.

4. The process of claim 1 wherein the proportion of said catalyst system is between about 1 and about 100 weight percent of said aromatic nitro compound.

5. The process of claim 1 wherein said aromatic nitro compound is selected from the group consisting of nitrobenzene, dinitrotoluene and isocyanato-nitrotoluene.

6. The process of claim 5 wherein said catalyst system contains a third component comprised of an oxide of a metal selected from the group consisting of vanadium, molybdenum, tungsten, niobium, chromium, iron and tantalum.

7. The process of claim 5 wherein said catalyst system is rhodium trichloride and aniline.

8. The process of claim 5 wherein said catalyst system is palladous chloride and o-phenylene diamine.

9. The process of claim 5 wherein said catalyst system is palladous chloride and o-aminophenol.

10. The process of claim 5 wherein said catalyst system is rhodium trichloride and aniline-2-sulfonic acid.

11. The process of claim 5 wherein said catalyst system is rhodium trichloride and N-phenyl anthranilic acid.

12. The process of claim 5 wherein said catalyst system is rhodium trichloride and triphenyl amine.

13. The process of claim 5 wherein said catalyst system is rhodium trichloride and benzyl amine.

14. The process of claim 5 wherein said catalyst system is rhodium trichloride and tri-n-butyl amine.

15. The process of claim 5 wherein said catalyst system is a complex of aniline and palladous chloride having the formula:

$$Pd(C_6H_5NH_2)_2Cl_2$$

16. The process of claim 5 wherein said catalyst system is a complex of dibenzyl amine and palladous chloride having the formula:

$$Pd[(C_6H_5CH_2)_2NH]_2Cl_2$$

17. The process of claim 5 wherein said catalyst system is a complex of tri-n-butyl amine and palladous chloride having the formula:

$$Pd[(C_4H_9)_3N]_2Cl_2$$

18. The process of claim 5 wherein said amine composition is selected from the group consisting of
(a) aniline
(b) aniline-2-sulfonic acid
(c) o-phenylene diamine
(d) anthranilic acid
(e) N-phenyl anthranilic acid
(f) anthranilamide
(g) o-aminophenol
(h) o-aminobenzene thiol
(i) benzyl amine
(j) dibenzyl amine
(k) tri-n-butyl amine
(l) diphenyl amine
(m) triphenyl amine 19. The process of claim 18 wherein said noble metal compound is selected from the group consisting of palladous chloride, rhodium trichloride, iridium trichloride, rhenium trichloride, platinium tetrachloride and mixtures thereof.

20. The process of claim 19 wherein said elevated pressure is in the range between about 30 and about 30,000 p.s.i.g., said elevated temperature is in the range between about 100° C. and about 250° C. and the proportion of carbon monoxide is in the range between about 3 and about 50 moles of carbon monoxide per nitro group in said aromatic nitro compound.

21. The process of claim 19 wherein said aromatic nitro compound is selected from the group consisting of nitrobenzene dinitrotoluene and isocyanato-nitrotoluene.

22. The process of claim 21 wherein the proportion of said catalyst system is between about 1 and about 100 weight percent of said aromatic nitro compound.

23. The process of claim 22 wherein the molar ratio of said amine composition to the anion of said noble metal compound is between 0.5:1 and 4:1.

24. The process of claim 23 wherein said elevated pressure is in the range between about 100 and about 20,000 p.s.i.g. said elevated temperature is in the range between about 100° C. and 250° C. and the proportion of carbon monoxide is in the range between about 8 and about 15 moles of carbon monoxide per nitro group in said aromatic nitro compound.

25. The process of claim 22 wherein said catalyst system contains a third component comprised of an oxide of a metal selected from the group consisting of vanadium, molybdenum, tungsten, niobium, chromium, iron and tantalum.

26. The process of claim 25 wherein said oxide of a metal is selected from the group consisting of chromic oxide, chromium dioxide, chromous oxide, molybdenum sesquioxide, molybdenum dioxide, molybdenum trioxide, niobium monoxide, niobium oxide, niobium pentoxide, tantalum dioxide, tantalum tetraoxide, tantalum pentoxide, tungstic oxide, tungstic trioxide, vanadium dioxide, vanadium trioxide, vanadium tetraoxide, vanadium pentoxide, ferrous oxide, ferric oxide and mixtures thereof.

27. The process of claim 26 wherein said oxide is molybdenum trioxide.

References Cited
UNITED STATES PATENTS 3,405,156   10/1968   Stern et al. _____ 260—453
3,461,149   8/1969   Hardy et al. _____ 260—453

CHARLES B. PARKER, Primary Examiner

D. H. TORRENCE, Assistant Examiner

U.S. Cl. X.R.

252—429 A, 429 C, 430; 260—243 A, 346.3, 429 R, 430, 476 R